(12) United States Patent
de la Fuente Sanchez

(10) Patent No.: US 12,547,121 B2
(45) Date of Patent: Feb. 10, 2026

(54) SOLAR POWERED WATCH

(71) Applicant: Solaires Entreprises Inc., Victoria (CA)

(72) Inventor: Alfonso Fabian de la Fuente Sanchez, Victoria (CA)

(73) Assignee: Solaires Entreprises Inc., Victoria (CA)

( * ) Notice: Subject to any disclaimer, the term of this patent is extended or adjusted under 35 U.S.C. 154(b) by 466 days.

(21) Appl. No.: 18/301,208

(22) Filed: Apr. 14, 2023

(65) Prior Publication Data

US 2024/0345544 A1    Oct. 17, 2024

(51) Int. Cl.
| | | |
|---|---|---|
| G04C 10/02 | (2006.01) | |
| H01G 9/20 | (2006.01) | |
| H10K 30/50 | (2023.01) | |
| H10K 39/10 | (2023.01) | |

(52) U.S. Cl.
CPC .............. *G04C 10/02* (2013.01); *H01G 9/20* (2013.01); *H01G 9/2068* (2013.01); *H10K 30/50* (2023.02); *H10K 39/10* (2023.02)

(58) Field of Classification Search
CPC ........ G04C 10/02; H01G 9/20; H01G 9/2068; H10K 30/50; H10K 39/10
See application file for complete search history.

(56) References Cited

U.S. PATENT DOCUMENTS

| | | | |
|---|---|---|---|
| 10,229,952 B2 * | 3/2019 | Uddin | H10K 30/152 |
| 11,177,691 B2 * | 11/2021 | Henry | H01M 50/247 |
| 11,368,043 B1 * | 6/2022 | Gamble | H02S 20/30 |
| 12,120,893 B2 * | 10/2024 | Huang | H10K 85/50 |
| 2014/0378853 A1 * | 12/2014 | McKinney | A61B 5/02438 600/509 |
| 2015/0277384 A1 * | 10/2015 | Mankowski | G16H 40/67 368/10 |
| 2023/0375981 A1 * | 11/2023 | Sedgwick | G04G 21/06 |

* cited by examiner

*Primary Examiner* — Edwin A. Leon
(74) *Attorney, Agent, or Firm* — Baumgartner Patent Law, LLC; Marc Baumgartner

(57) ABSTRACT

A wristband is provided for use with a timepiece, the wristband comprising a band, at least one photovoltaic cell which is retained by the band, a rechargeable battery which is retained in the band and is in electrical communication with the photovoltaic cell and an electrical connection from the rechargeable battery for electrical communication with the timepiece. A solar powered watch is also provided.

17 Claims, 4 Drawing Sheets

SOLAR POWERED WATCH

FIELD

The present technology is directed to a solar powered watch. More specifically, it is a solar powered watch that includes a wristband with at least one photovoltaic cell.

BACKGROUND

Battery-driven watches need to have a charged battery in order to operate. A battery can be charged either by recharging it in the case of rechargeable batteries or replaced by a fresh one with a charge. Watches and some smartwatches only need a small amount of energy to operate.

A watch consists of a timepiece and a wristband. Wristbands are made of materials including fabric, silicon, plastic or metals, in some cases they are even made of rare metals like silver, platinum or gold.

Most smartwatches have microprocessors and displays which consume more energy than regular watches.

What is needed is a watch that does not rely on a replaceable battery. It would be preferable if it included at least one photovoltaic cell. It would be further preferable if it included a plurality of photovoltaic cells. It would be further preferable if the photovoltaic cells included a semi-conductor layer comprising a perovskite material that was tuneable. It would still further preferable if the photovoltaic cells were a component of the wristband of the watch.

SUMMARY

The present technology is a watch that does not rely on a replaceable battery. It includes at least one photovoltaic cell. The photovoltaic cells include a semi-conductor layer comprising a perovskite material that is tuneable. The photovoltaic cells are a component of the wristband of the watch.

In one embodiment, a wristband is provided for use with a timepiece, the wristband comprising a band, at least one photovoltaic cell which is retained by the band, a battery which is retained in the band and is in electrical communication with the photovoltaic cell and an electrical connection from the battery for electrical communication with the timepiece.

In the wristband, the photovoltaic cell may include a semi-conductor comprising a perovskite material.

In the wristband, the perovskite material may have a band gap of 1.75 to 2.0 electron Volts.

In the wristband, the perovskite material may include cesium, bromine, iodine and formamidinium.

In the wristband, the photovoltaic cell may be embedded in the band and at least a portion of the band between the photovoltaic cell and an ambient environment is optically transparent.

The wristband may further comprise a data transmission and reception module which is in electrical communication with the photovoltaic cell.

The wristband further may comprise at least a second photovoltaic cell, wherein the second photovoltaic cell includes a semi-conductor which is a perovskite material with a band gap of 1.4 to 1.7 electron Volts.

The wristband may further comprise a second photovoltaic cell, wherein the second photovoltaic cell includes a semi-conductor layer which is one or more of a methyl ammonium lead halide or a formamidinium lead halide.

In the wristband, the photovoltaic cells are flexible.

In another embodiment, a solar powered watch is provided, the solar powered watch comprising: a timepiece which includes a power distribution system; and a wristband, the wristband including a band which is attached to the timepiece, at least one photovoltaic cell which is retained by the band, a rechargeable battery which is retained in the band and is in electrical communication with the photovoltaic cell and an electrical connection from the rechargeable battery in electrical communication with the timepiece.

In the solar powered watch, the photovoltaic cell may include a semi-conductor comprising a perovskite material.

In the solar powered watch, the photovoltaic cell may be embedded in the band and at least a portion of the band between the photovoltaic cell and an ambient environment is optically transparent.

In the solar powered watch, the perovskite material may have a band gap of 1.75 to 2.0 electron Volts.

In the solar powered watch, the perovskite material may include cesium, bromine, iodine and formamidinium.

In the solar powered watch, the wristband may further comprise a data transmission and reception module which is in electrical communication with the photovoltaic cell.

In the solar powered watch, the wristband may further comprise at least a second photovoltaic cell, wherein the second photovoltaic cell includes a semi-conductor which is a perovskite material with a band gap of 1.4 to 1.7 electron Volts.

The solar powered watch may further comprise a second photovoltaic cell, wherein the second photovoltaic cell includes a semi-conductor which is one or more of a methyl ammonium lead halide or a formamidinium lead halide.

DESCRIPTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising." "having." "including." and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Figure 1:
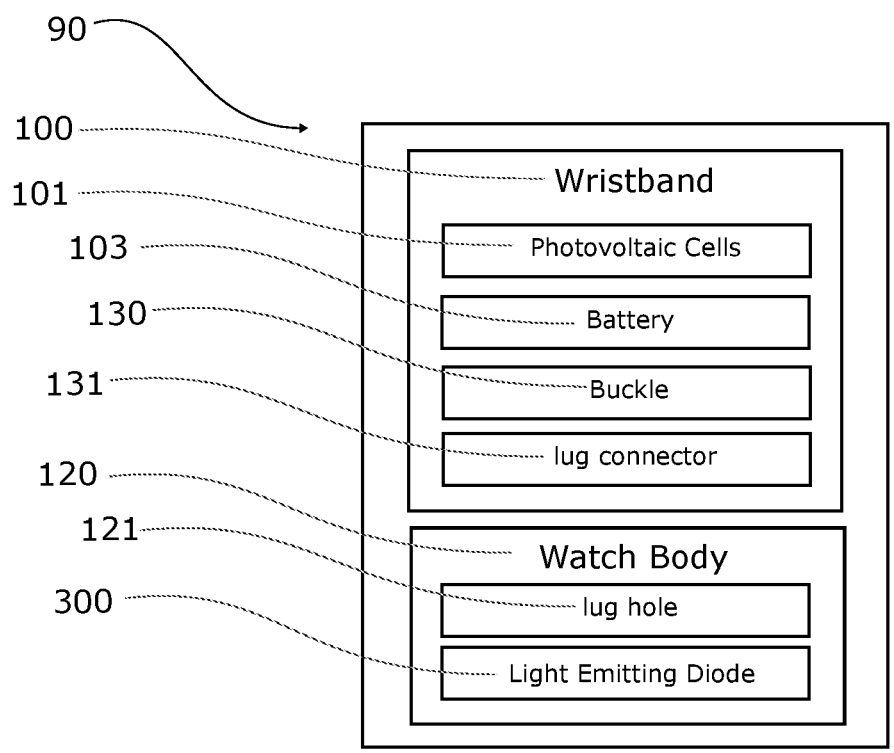
FIG. 1 shows a block diagram of the technology.
Figure 2:
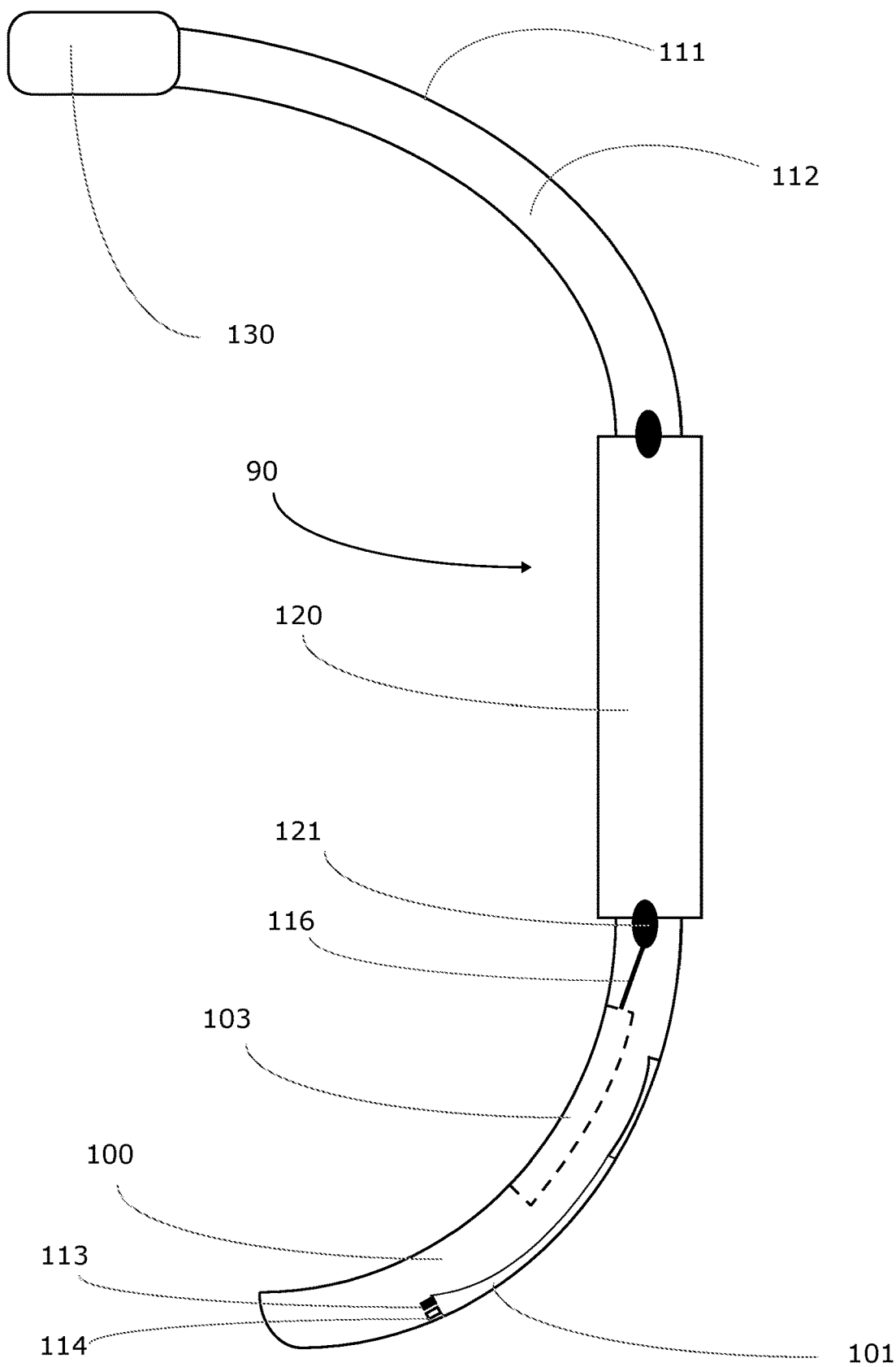
FIG. 2 shows a side-view of the photovoltaic system and watch body of the technology of FIG. 1.

A solar powered watch, generally referred to as 90, is shown in FIG. 1. The wristband 100 includes at least one photovoltaic cell 101, a rechargeable battery 103, a buckle 130 and a lug connector 131. The watch body 120 includes a lug hole 121 and a light emitting diode 300. The light emitting diode 300 is a visual indicator that the photovoltaic cell 101 is functioning. The solar powered watch 90 may be a smart watch. In this embodiment, power consumption may be greater than the power produced by the photovoltaic cells 103, thus the extra power needed would be supplied by the rechargeable battery 103.

The photovoltaic cell 101 is attached to the outer surface 111 of the band 112 of the wristband 100. A positive and a negative terminal 113, 114 connect the photovoltaic cell 101 to the rechargeable battery 103. The rechargeable battery 103 is embedded in the band 112 of the wristband 100. An electrical connection 116 connects the rechargeable battery 103 to the power distribution system of the watch body 120 (timepiece) via the lug hole 121.

In one embodiment, the photovoltaic cell 101 includes a perovskite material as the semiconductor. One familiar with the art will appreciate that a perovskite solar cell (PSC) is a type of photovoltaic cell which includes a perovskite-structured compound, most commonly a hybrid organic-inorganic lead or tin halide-based material, as the light-harvesting active layer. Perovskite materials, such as methylammonium lead halides and all-inorganic cesium lead halides, are inexpensive to produce and simple to manufacture. The photovoltaic cell 101 is rigid in one embodiment and is flexible in another embodiment. In an alternative embodiment of the technology, the photovoltaic cell 101 has a predetermined colour that matches or combines with the colour of the wristband 100.

The energy conversion bandgap of the perovskite photovoltaic cell is 1.18 electron volts (eV) to 2.6 eV based on the components in the active perovskite layer of the photovoltaic cell. Indoor light source spectra range from 200-700 nm whereas outdoor light source spectra ranges from 300-1100 nm. The preferred bandgap to capture maximum indoor light ranges from 1.8 eV to 1.95 eV and for outdoor light it is 1.4 to 1.7 eV, or a narrower range of 1.5 to 1.6 eV. Hence, the bandgap is tuned. For the smartwatch to capture outdoor light, the bandgap of the perovskite material is 1.4-1.7 eV. In an alternative embodiment, the bandgap of the perovskite material is 1.5 to 1.6 eV. An example of suitable perovskite materials are methylammonium lead halides. For the smartwatch to capture indoor light, the bandgap for the perovskite material is preferably 1.7.5 to 2.0 eV, more specifically 1.8 eV to 1.95 eV. Suitable perovskite materials for the semiconductor layer include Cs, Br, I, FA. An example of a suitable perovskite material $Cs_{0.7}FA_{0.3}Pb(I_{0.5}Br_{0.5})_3$. In a preferred embodiment, the wristband 100 includes at least two photovoltaic cell 101, with one having a band gap tuned to 1.75 to 2.0 eV and at least a second photovoltaic cell 101 having a band gap tuned to 1.4 to 1.7 eV. The second photovoltaic cell 101 has a semi-conductor layer that comprises one or more of methylammonium lead halide or formamidinium lead halide.

One familiar with the art will appreciate that an important characteristic of the most commonly used perovskite system, the methylammonium lead halides, is a bandgap controllable by the halide content. The materials also display a diffusion length for both holes and electrons of over one micron. The long diffusion length means that these materials can function effectively in a thin-film architecture and that charges can be transported in the perovskite itself over long distances. When one can fine-tune the bandgap of the perovskite, it is possible to convert solar energy to electricity as well as to convert indoor light, for example, incandescent light, to electricity.

In an alternative embodiment of the technology, the positive and a negative terminal 113, 114 are located at one end of the wristband 100. In one embodiment, the wristband 100 includes the buckle 130 or other closure, for example, but not limited to a Velcro® closure. In another embodiment, the wristband 100 does not include a closure and can simply be slid onto the user's wrist.

In one embodiment of the technology, the band 112 is made of one or more of fabric, leather, metal, synthetic, plastic, and silicone.

Figure 3:
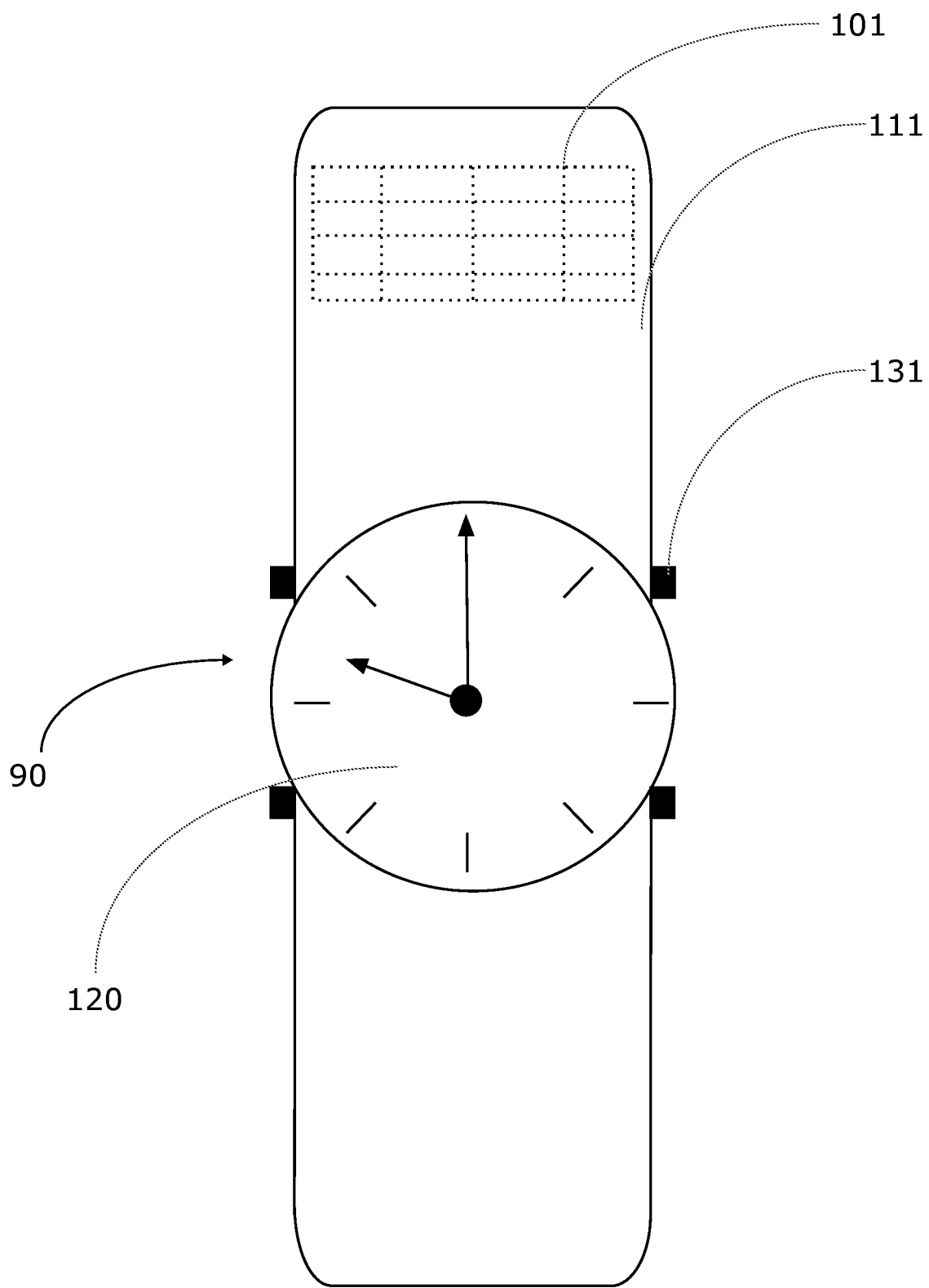
FIG. 3 shows a front view of the watch body and the wristband.

In an alternative embodiment, as shown in FIG. 3, the photovoltaic cell 101 is embedded in the band 112 of the solar powered watch 90. In this embodiment, either the entire band 112 is optically transparent or the portion of the band 112 between the photovoltaic cell 101 and the ambient environment is optically transparent.

Figure 4:
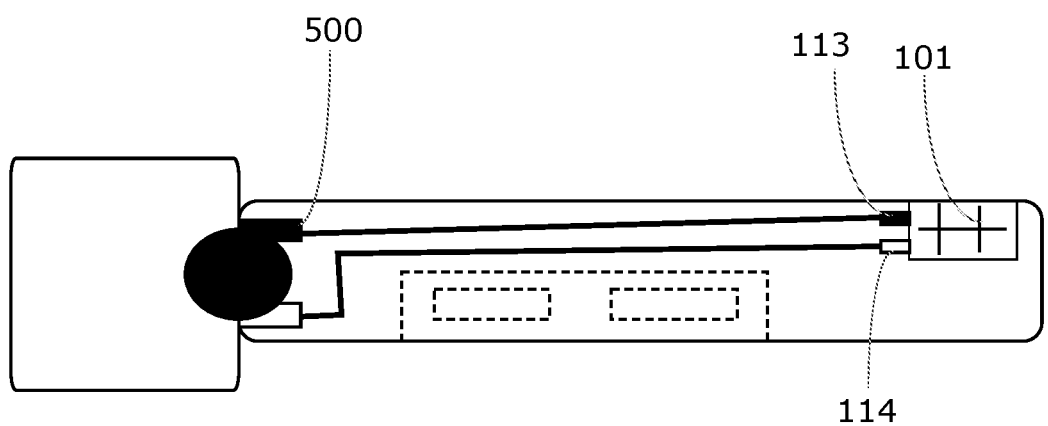
FIG. 4 is an alternative embodiment of the technology of FIG. 1.

As shown in FIG. 4, in an alternative embodiment of the technology, the wristband 100 of the solar powered watch 90 includes a data transmission and reception module 500. The photovoltaic cell 101 is in direct electrically communication with the data transmission and reception module 500 via an electrical connection which includes terminals 600. The data transmission and reception module 500 reports on rechargeable battery status of both power distribution system of the watch body 120 and the rechargeable battery 103 of the wristband 100, as well as the power generation of the photovoltaic cell or cells 101.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A wristband for use with a timepiece, the wristband comprising a band, at least one photovoltaic cell which is retained by the band, a rechargeable battery which is retained in the band and is in electrical communication with the photovoltaic cell and an electrical connection from the rechargeable battery for electrical communication with the timepiece.

2. The wristband of claim 1, wherein the photovoltaic cell includes a semi-conductor comprising a perovskite material, wherein the perovskite material includes cesium, bromine, iodine and formamidinium.

3. The wristband of claim 2, wherein the perovskite material has a band gap of 1.75 to 2.0 electron Volts.

4. The wristband of claim 3, wherein the photovoltaic cell is embedded in the band and at least a portion of the band between the photovoltaic cell and an ambient environment is optically transparent.

5. The wristband of claim 4, further comprising a data transmission and reception module which is in electrical communication with the photovoltaic cell.

6. The wristband of claim 5, further comprising a second photovoltaic cell, wherein the second photovoltaic cell includes a semiconductor layer which is a perovskite material with a band gap of 1.4 to 1.7 electron Volts.

7. The wristband of claim 6, further comprising a second photovoltaic cell, wherein the second photovoltaic cell includes a semi-conductor which is a formamidinium lead halide or a combination of a methyl ammonium lead halide or a formamidinium lead halide.

8. The wristband of claim 6, wherein the photovoltaic cells are flexible.

9. A solar powered watch, the solar powered watch comprising: a timepiece which includes a power distribution system; and a wristband, the wristband including a band which is attached to the timepiece, at least one photovoltaic cell which is retained by the band, a rechargeable battery which is retained in the band and is in electrical communication with the photovoltaic cell and an electrical connection from the rechargeable battery in electrical communication with the timepiece.

10. The solar powered watch of claim 9, wherein the photovoltaic cell includes a semi-conductor comprising a perovskite material, wherein the perovskite material includes cesium, bromine, iodine and formamidinium.

11. The solar powered watch of claim 10, wherein the photovoltaic cell is embedded in the band and at least a portion of the band between the photovoltaic cell and an ambient environment is optically transparent.

12. The solar powered watch of claim 11, wherein the perovskite material has a band gap of 1.75 to 2.0 electron Volts.

13. The solar powered watch of claim 12, wherein the wristband further comprises a data transmission and reception module which is in electrical communication with the photovoltaic cell.

14. The solar powered watch of claim 13, wherein the wristband further comprises a second photovoltaic cell, wherein the second photovoltaic cell includes a semi-conductor which is a perovskite material with a band gap of 1.4 to 1.7 electron Volts.

15. The solar powered watch of claim 14, further comprising a second photovoltaic cell, wherein the second photovoltaic cell includes a semi-conductor layer which is a formamidinium lead halide or a combination of a methyl ammonium lead halide or a formamidinium lead halide.

16. The solar powered watch of claim 15, wherein the timepiece includes a light emitting diode which is in electrical communication with the plurality of photovoltaic cells.

17. The solar powered watch of claim 15, wherein the solar powered watch is a smart watch.

* * * * *